(12) United States Patent
Kim (10) Patent No.: US 9,367,138 B2
(45) Date of Patent: Jun. 14, 2016

(54) REMOTE MANIPULATION DEVICE AND METHOD USING A VIRTUAL TOUCH OF A THREE-DIMENSIONALLY MODELED ELECTRONIC DEVICE (75) Inventor: Seok-Joong Kim, Seoul (KR)

(73) Assignee: VTOUCH CO., LTD., Seoul (KR)

( * ) Notice: Subject to any disclaimer, the term of this patent is extended or adjusted under 35 U.S.C. 154(b) by 83 days.

(21) Appl. No.: 14/232,310

(22) PCT Filed: Jul. 6, 2012

(86) PCT No.: PCT/KR2012/005362
§ 371 (c)(1),
(2), (4) Date: Mar. 14, 2014

(87) PCT Pub. No.: WO2013/009040
PCT Pub. Date: Jan. 17, 2013

(65) Prior Publication Data
US 2014/0184499 A1 Jul. 3, 2014

(51) Int. Cl.
G06F 3/01 (2006.01)
G08C 17/00 (2006.01)
G06F 3/00 (2006.01)
G08C 17/02 (2006.01)
G08C 23/04 (2006.01)

(52) U.S. Cl.
CPC ............... *G06F 3/017* (2013.01); *G06F 3/005* (2013.01); *G06F 3/011* (2013.01); *G08C 17/00* (2013.01); *G08C 17/02* (2013.01); *G08C 23/04* (2013.01); *G08C 2201/32* (2013.01); *G08C 2201/91* (2013.01)

(58) Field of Classification Search
CPC ......... G06F 3/017; G06F 3/005; G06F 3/011; G08C 17/00; G08C 17/02; G08C 23/04; G08C 2201/32; G08C 2201/91
USPC .................................................. 345/156–184
See application file for complete search history.

(56) References Cited

U.S. PATENT DOCUMENTS

| 6,147,678 | A | * | 11/2000 | Kumar et al. | 345/158 |
| 6,434,255 | B1 | * | 8/2002 | Harakawa | 382/103 |
| 6,531,999 | B1 | * | 3/2003 | Trajkovic | 345/157 |
| 2002/0057383 | A1 | * | 5/2002 | Iwamura | 348/734 |
| 2005/0174326 | A1 | * | 8/2005 | Soh et al. | 345/156 |
| 2005/0248529 | A1 | * | 11/2005 | Endoh | 345/156 |

(Continued)

FOREIGN PATENT DOCUMENTS

KR 10-2002-0025198 A 4/2002
KR 10-2009-0050567 A 5/2009

(Continued)

OTHER PUBLICATIONS

International Search Report for PCT/KR2012/005362 mailed Jan. 2, 2013 from Korean Intellectual Property Office.

*Primary Examiner* — Dmitriy Bolotin
(74) *Attorney, Agent, or Firm* — Paratus Law Group, PLLC (57) ABSTRACT Disclosed is a remote control apparatus and method using a virtual touch of a three-dimensionally modeled electronic device. The remote control apparatus includes a 3D coordinate calculation unit, an electronic device detecting unit, a user detecting unit, an electronic device driving control unit, and an electronic device information database. The remote control apparatus enables the user to remotely control an operation of an electronic device using a virtual touch through a motion or gesture of the user's finger.

17 Claims, 7 Drawing Sheets

(56) References Cited

U.S. PATENT DOCUMENTS

| | | | |
|---|---|---|---|
| 2006/0187196 A1* | 8/2006 | Underkoffler et al. | 345/156 |
| 2006/0214926 A1* | 9/2006 | Kolmykov-Zotov et al. | 345/179 |
| 2010/0241998 A1* | 9/2010 | Latta et al. | 715/862 |
| 2011/0267265 A1* | 11/2011 | Stinson | 345/157 |
| 2011/0296353 A1* | 12/2011 | Ahmed et al. | 715/848 |
| 2012/0044139 A1* | 2/2012 | Kim et al. | 345/157 |
| 2012/0206333 A1* | 8/2012 | Kim | 345/156 |
| 2012/0268424 A1* | 10/2012 | Kim et al. | 345/175 |
| 2014/0152869 A1* | 6/2014 | Solotko | 348/231.3 |

FOREIGN PATENT DOCUMENTS

| | | |
|---|---|---|
| KR | 10-2010-0129629 A | 12/2010 |
| KR | 10-2011-0037053 A | 4/2011 |

* cited by examiner

REMOTE MANIPULATION DEVICE AND METHOD USING A VIRTUAL TOUCH OF A THREE-DIMENSIONALLY MODELED ELECTRONIC DEVICE

CROSS REFERENCE TO PRIOR APPLICATION

This application is a National Stage Patent Application of PCT International Patent Application No. PCT/KR2012/005362 (filed on Jul. 6, 2012) under 35 U.S.C. §371, which claims priority to Korean Patent Application No. 10-2011-0068383 (filed on Jul. 11, 2011), which are all hereby incorporated by reference in their entirety.

TECHNICAL FIELD

The following disclosure relates to an apparatus and method of remotely controlling an electronic device, and more particularly, to a remote control apparatus and method, which can remotely control an operation of an electronic device using a virtual touch through a motion (gesture) of a tip of a user's finger without a remote control unit such as a remote controller.

BACKGROUND ART

Recently, electronic equipment such as smart phones including a touch panel is being widely used. Such a touch panel technology needs not to display 'a pointer' on a display unlike electronic equipment such as typical computers that is controlled by a mouse. For control of electronic equipment, a user locates his/her finger on icons and touches them without locating a pointer (a cursor of a computer) on a certain location (e.g., program icon). The touch panel technology enables quick control of electronic equipment because it needs not to move a 'pointer' that is essential as a typical electronic control means.

However, since a user has to directly touch a display surface in spite of the above convenience of the touch panel technology, there is a limitation in that the touch panel technology could not be used for remote control. Accordingly, even electronic equipment using the touch panel technology has to depend on a device such as a typical remote controller.

A technology using an apparatus capable of generating a pointer on an exact point as a remote control apparatus for electronic equipment like the touch panel technology is disclosed in Korean Patent Publication No. 10-2010-0129629, published Dec. 9, 2010. The technology includes photographing the front surface of a display using two cameras and then generating a pointer on a point where the extension lines of the eye and finger of a user meet the display. However, the technology has an inconvenience in that a pointer is necessarily generated as a preliminary measure for control of electronic equipment (including a pointer controller) and then gestures of a user has to be compared with already-stored patterns for concrete operation control.

Also, there is a limitation in that a method of remotely controlling an electronic device by generating a pointer at a point where extending straight lines of an eye and a finger of a user meet a point on a display from the photographed image is necessarily limited to electronic devices including display units with a large screen (having a sufficiently large size for a user to confirm an operated icon even from a remote distance). For this, since the remote control is possible only from the front side of the electronic device, a user needs to be positioned at the front side of the electronic device to operate the electronic device. Furthermore, in a related art, since the electronic device is configured to be operated by a communication between the electronic device and a camera controller, the electronic device can be remotely operated only when the electronic device is fixedly located. Accordingly, the remotely controllable electronic devices are inevitably limited to immobile electronic devices.

DISCLOSURE

Technical Problem

Accordingly, the present disclosure provides a remote control apparatus and method, which can be applied to all types of electronic devices that are operated using a typical remote controller regardless of the presence or absence of a display unit by operating the electronic device using a virtual touch through a motion (gesture) of a user from a remote place.

The present disclosure also provides a remote control apparatus and method, which can remotely control an electronic device located at every location in house regardless of a motion of the electronic device and a location and direction between the user and the electronic device using a virtual touch through a motion (gesture) of a finger tip of a user from a remote place.

The present disclosure also provides a remote control apparatus and method, which is configured separately from an electronic device to be remotely controlled, being applicable to various types of mobile electronic devices through easy calculation of changed 3D spatial coordinates of the electronic device even when the electronic device moves.

Technical Solution

In one general aspect, a remote control apparatus using a virtual touch of a three-dimensionally modeled electronic device includes: a 3D coordinate calculation unit extracting 3D coordinate data of a user's body and the electronic device using an image received through image photographing; an electronic device detecting unit recognizing spatial location information and product information of the electronic device using the 3D coordinate data of the electronic device extracted by the 3D coordinate calculation unit and generating a virtual contact point region for a virtual touch with a user and the electronic device based on direction information corresponding to a straight line between the user and the electronic device; a user detecting unit calculating a virtual touch location and a change of the location for operating the electronic device using the 3D coordinate data of the user's body calculated by the 3D coordinate calculation unit and generating a command code for operating a predetermined electronic device based on the change of the virtual touch location that is calculated; an electronic device driving control unit converting the command code generated by the user detecting unit into a control command signal for operating a corresponding electronic device to transmit an operation command signal to the corresponding electronic device when the command code generated by the user detecting unit is inputted; and an electronic device information database (DB) storing product information comprising a manufacturer and a model name of the electronic device, protocol information applied to the operation of each product, and operation method information of each electronic device.

The 3D coordinate calculation unit may include: an image acquisition unit comprising two or more image sensors disposed at different locations to photograph the user's body and the electronic device from different angles; and a spatial coordinate calculation unit calculating the 3D coordinate data of the user's body and the electronic device using optical triangulation based on the images received from the image acquisition unit and photographed from the different angles.

The 3D coordinate calculation unit may include: a lighting assembly comprising a light source and a light diffuser to project a speckle pattern on the user's body and the electronic device; an image acquisition unit comprising an image sensor and a lens to capture the speckle pattern on the user's body and the electronic device projected by the lighting assembly; and a spatial coordinate calculation unit calculating the 3D coordinate data of the user's body and the electronic device using the speckle pattern captured by the image acquisition unit.

The electronic detecting unit may include: a 3D modeling unit performing 3D modeling according to a type of the electronic device based on the 3D spatial coordinate of the electronic device calculated by the 3D coordinate calculation unit; an electronic device setting unit, based on the type of the 3D-modeled electric device, comparing the 3D-modeled electronic device with the electronic device information pre-stored in the electronic device information DB to detect the corresponding electronic device, and setting a control signal according to the operation of the detected electronic device; and a touch location matching unit for matching direction information corresponding to a straight line between the user and the electronic device to generate a virtual two-dimensional contact point region for the virtual touch between the user and the electronic device based on the direction information that is matched The user detecting unit may include: a touch location calculation unit for calculating a first spatial coordinate and a second spatial coordinate based on a 3D spatial coordinate of the user's body calculated by the 3D coordinate calculation unit to calculate contact point coordinate data where a straight line connecting the first spatial coordinate and the second spatial coordinate meets the virtual contact point region; and a virtual touch processing unit determining whether or not there is a change of the contact point coordinate data calculated by the touch location calculation unit and generating a command code for operating a predetermined electronic device when it is determined that there is a change of the contact point coordinate data.

The first spatial coordinate may be a three-dimensional coordinate of a tip of one of user's fingers or a tip of a pointer gripped by the user's fingers, and the second spatial coordinate may be a three-dimensional coordinate of a central point of one of user's eyes.

The virtual touch processing unit may determine whether or not there is a change of the contact point coordinate data for a predetermined time or more after the initial contact point coordinate data is calculated, and when there is a change of the contact point coordinate data for the predetermined time or more, it may be determined that there is a change of the contact point coordinate data The virtual touch processing unit may determine whether or not there is a change of the contact point coordinate data for a predetermined time or more after the initial contact point coordinate data is calculated, and when there is no change of the contact point coordinate data for the predetermined time or more, the virtual touch processing unit may determine whether or not there is a change in distance equal to or larger than a predetermined distance between the first spatial coordinate and the second spatial coordinate; and when there is a change in distance equal to or larger than a predetermined distance, the virtual touch processing unit may generate a command code for operating a predetermined electronic device.

The electronic device driving control unit may transmit the operation command signal by a short range wireless communication method comprising Infrared Ray (IR) signal, WiFi, and Bluetooth.

In another general aspect, a remote control method using a virtual touch of a three-dimensionally modeled electronic device includes: (A) extracting 3D coordinate data of a user's body and the electronic device using an image received through image photographing; (B) scanning the electronic device using 3D coordinate data according to the electronic device among the calculated 3D coordinate data to perform 3D modeling according to a type of the electronic device; (C) based on the type of the 3D-modeled electric device, comparing the 3D-modeled electronic device with the electronic device information pre-stored in an electronic device information database to detect the corresponding electronic device, and setting a control signal according to the operation of the detected electronic device; (D) matching direction information corresponding to a straight line between the user and the electronic device to generate a virtual contact point region for the virtual touch between the user and the electronic device based on the direction information that is matched; (E) calculating a first spatial coordinate having a 3D coordinate of a tip of a user's finger and a second spatial coordinate having a 3D coordinate of a central point of a user's eye using the 3D coordinate data of the user's body among the calculated 3D coordinate data and calculating contact point coordinate data where a straight line connecting the first spatial coordinate and the second spatial coordinate meets the virtual contact point region that is generated; (F) determining whether or not there is a change of the contact point coordinate data that meets the virtual 2D contact point region that is generated, and when there is a change of the contact point coordinate data, generating and outputting a command code of a predetermined electronic device so as to correspond to the change of the contact point coordinate data; and (G) converting the generated command code into a control command signal for operating a corresponding electronic device to transmit an operation command signal to the corresponding electronic device.

(A) the extracting of the 3D coordinate data may include: photographing the user's body and the electronic device from different angles through an image acquisition unit comprising two or more image sensors disposed at different locations; and calculating the 3D coordinate data of the user's body and the electronic device using optical triangulation based on images photographed from the different angles.

(A) the extracting of the 3D coordinate data may include: projecting a speckle pattern on the user's body and the electronic device through a light assembly; capturing the speckle pattern on the user's body and the electronic device projected by the light assembly; and calculating the 3D coordinate data of the user's body and the electronic device using the speckle pattern that is captured.

(F) the determining of whether or not there is a change of the contact point coordinate data may include determining whether or not there is a change of the contact point coordinate data for a predetermined time or more after the initial contact point coordinate data are calculated, and when there is a change of the contact point coordinate data for the predetermined time or more, determining that there is a change of the contact point coordinate data.

(F) the determining of whether or not there is a change of the contact point coordinate data may include: determining whether or not there is a change of the contact point coordinate data for a predetermined time or more after the initial contact point coordinate data is calculated, and when there is no change of the contact point coordinate data for the predetermined time or more, determining whether or not there is a change in distance equal to or larger than a predetermined distance between the first spatial coordinate and the second spatial coordinate; and generating a command code for operating a predetermined electronic device when there is a change in distance equal to or larger than a predetermined distance.

The converting of the generated command code into a control command signal may include transmitting the operation command signal by a short range wireless communication method comprising Infrared Ray (IR) signal, WiFi, and Bluetooth.

(F) the determining of whether or not there is a change of the contact point coordinate data may include: setting a touch region for a virtual touch operation in the generated 2D contact point region according to the operation method information pre-stored in the electronic device information database; calculating the contact point data where the straight line connecting the first spatial coordinate and the second spatial coordinate meets the virtual contact point region; and performing, by a user, at least one virtual touch operation of upward, downward, left, right, forward, and backward directions in the preset touch region of the virtual contact point region to request an operation of the electric device, and when it is determined that there is a change of the calculated contact point coordinate data according to a change of the first spatial coordinate, generating a command code for operating a predetermined electric device so as to correspond to the change of the contact point coordinate data.

The contact point region may be located between the electric device and the user regardless of the front, lateral, rear direction of the electric device to allow the user to operate the electric device through the virtual touch in any direction of the electronic device.

Other features and aspects will be apparent from the following detailed description, the drawings, and the claims.

Advantageous Effects

As described above, a remote control apparatus and method using a virtual touch of a 3D-modeled electronic device according to an embodiment of the present invention has the following effects.

First, since an electronic device is operated by a method of virtually touching a body of a 3D-modeled electronic device instead of a method of virtually touching an operation icon indicated using a pointer through a display unit, the electronic device can be quickly operated. Accordingly, the remote control apparatus and method can be applied to all types of electronic devices that do not include the display units.

Second, studies on the virtual touch have been limited only to application technologies using display units. Thus, the present invention can provide a new touch recognition method that can accurately operate the operation of the electronic device while being used for virtual touch apparatuses without display units.

Third, the remote control apparatus can be configured separately from the electronic device to be remotely controlled, being applicable to all types of mobile electronic devices because the calculation of a changed 3D spatial coordinate of the electronic device is free even when the electronic device moves.

Fourth, in addition to electronic devices, the remote control apparatus can be applied to various application technologies by providing a virtual touch through 3D modeling to perform operations corresponding to the virtual touch in case of apparatuses that need convenient operations through switching such as curtain and auto door lock.

BEST MODE

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
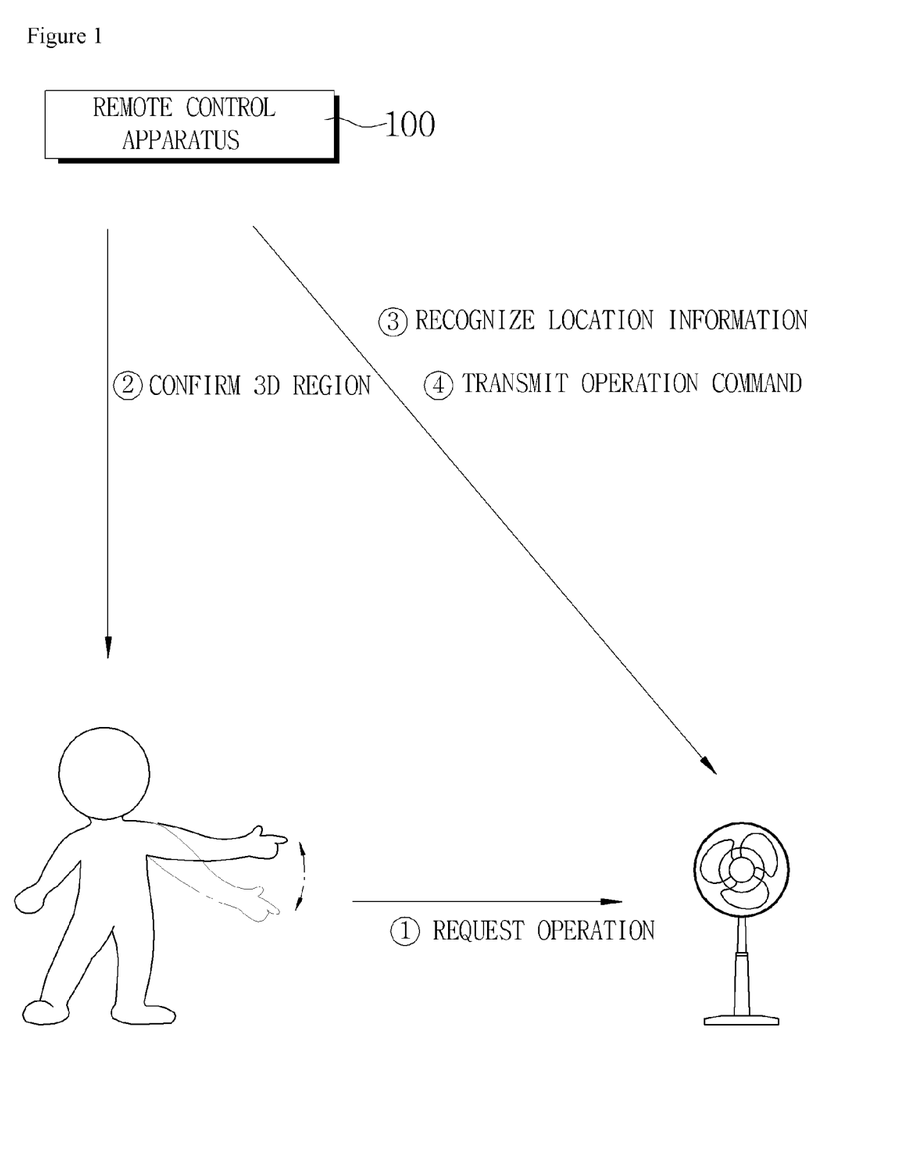
FIG. 1 is a view illustrating a whole system of a remote control using a virtual touch of a three-dimensionally modeled electronic device according to an embodiment of the present invention.

FIG. 1 is a view illustrating a whole system of a remote control using a virtual touch of a three-dimensionally modeled electronic device according to an embodiment of the present invention.

As shown in FIG. 1, when a user requests an operation of an electronic device 200 using a virtual touch through a motion (gesture) of the hand and the like from a remote place, a remote control apparatus 100 may extract 3D coordinate data of a user's body through the motion of a user to confirm a 3D region and recognize the location of the electronic device 200 that is requested to operate by a user. Also, the remote control apparatus 100 may generate an operation command signal of the electronic device 200 corresponding to the motion of a user to transmit the operation command signal to the corresponding electronic device 200, controlling the corresponding electronic device 200.

Thus, as the remote control is performed using the location information of the electronic device, the remote control apparatus 100 may be applicable to all types of electronic device that is controlled by a typical remote controller regardless of the presence and absence of a display unit.

Hereinafter, the configuration of the remote control apparatus 100 will be described in more detail.

Embodiment 1

Figure 2:
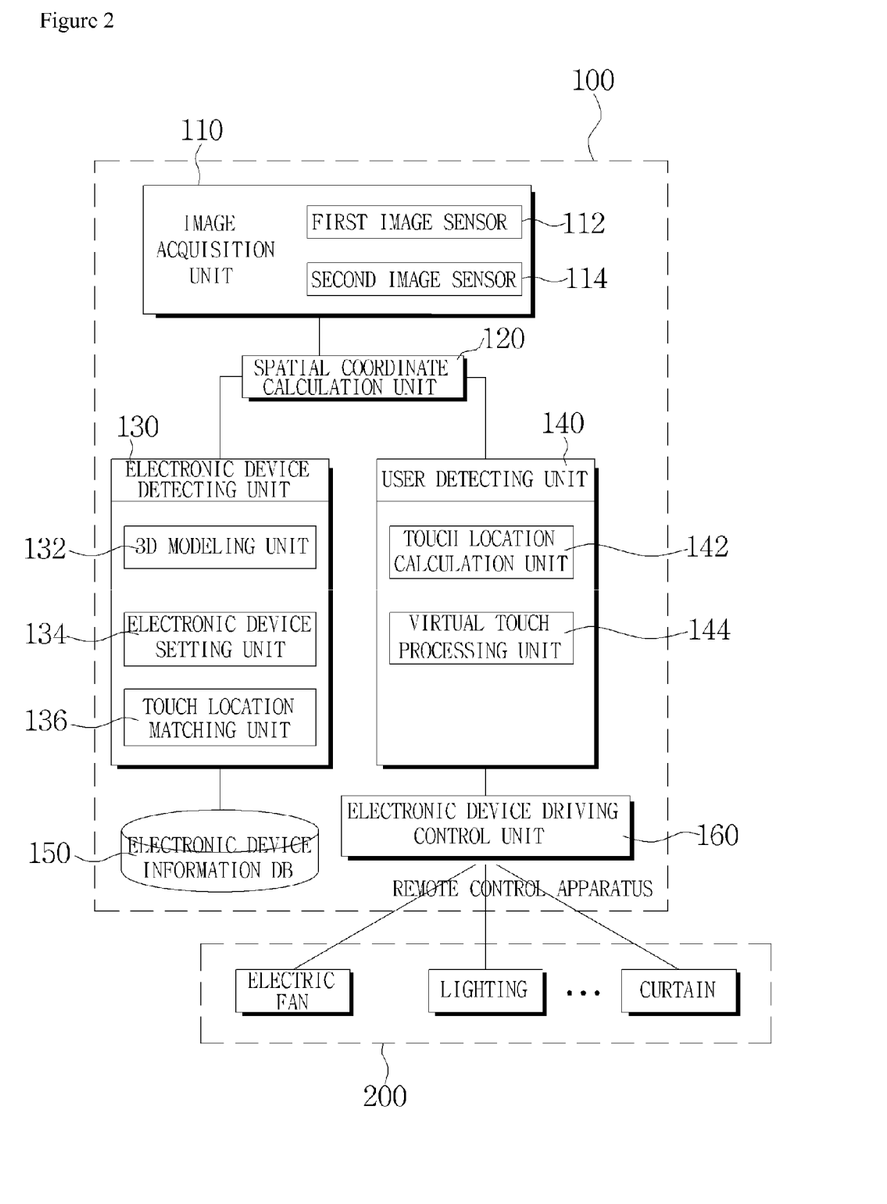
FIG. 2 is a view illustrating a remote control apparatus using a virtual touch of a 3D-modeled electronic device according to a first embodiment of the present invention.

FIG. 2 is a view illustrating a remote control apparatus using a virtual touch of a 3D-modeled electronic device according to a first embodiment of the present invention.

As shown in FIG. 2, a remote control apparatus 100 may include an image acquisition unit 100, a spatial coordinate calculation unit 120, an electronic device detecting unit 130, a user detecting unit 140, an electronic device driving control unit 160, and an electronic device information database (DB) 150.

The image acquisition unit 110, which is a sort of camera module, may include two or more image sensors 112 and 114 such as CCD or CMOS, which detect an image to convert the image into an electrical image signal.

The spatial coordinate calculation unit 120 may calculate three-dimensional data of the user's body and the electronic device using the image received from the image acquisition unit 110. According to the embodiment, the image sensors 112 and 114 constituting the image acquisition unit 110 may photograph the user's body and the electronic device from different angles, and the spatial coordinate calculation unit 120 may calculate 3D coordinate data of the user' body and the electronic device using passive optical triangulation.

Generally, the optical 3D coordinate calculation method may be classified into an active type and a passive type according to the sensing method. The active type may typically use structured light or laser light, which calculates the 3D coordinate data of an object by projecting a predefined pattern or a sound wave to the object and then measuring a variation through control of sensor parameters such as energy or focus. On the other hand, the passive type may use the intensity and parallax of an image photographed when energy is not artificially projected to an object.

In this embodiment, the passive type that does not project energy to an object is adopted. The passive type may be reduced in precision compared to the active type, but may be simple in equipment and can directly acquire a texture from an input image.

In the passive type, 3D information can be acquired by applying the optical triangulation method regarding features corresponding to photographed images. Examples of related techniques that extract the 3D coordinates using the triangulation may include a camera self calibration method, a Harris corner extracting method, SIFT method, and RANSAC method, and Tsai method. Particularly, a stereoscopic camera technique may also be used as a method of calculating the 3D coordinate data. The stereoscopic camera technique is a method of acquiring a distance from an expected angle with respect to a point by observing the same point of the surface of an object from two different points, similarly to a structure of binocular stereoscopic view that obtains a variation of an object from two eyes of human. The above-mentioned 3D coordinate calculation techniques can be easily carried out by those skilled in the art, a detailed description thereof will be omitted herein. Meanwhile, regarding the method of calculating 3D coordinate data using a 2D image, there are many patent-related documents, for example, Korean Patent Application Publication Nos. 10-0021803, 10-2004-0004135, 10-2007-0066382, and 10-2007-0117877.

The electronic device detecting unit 130 may include a 3D modeling unit 132, an electronic device setting unit 134, and a touch location matching unit 136. The electronic device detecting unit 130 may recognize spatial location information and product information of the electronic device 200 using the 3D coordinate data of the electronic device 200 calculated by the spatial coordinate calculation unit 120, and may generate a virtual contact point region for a virtual touch with the user and the electronic device based on the direction information corresponding to a straight line between the user and the electronic device.

In this case, the 3D modeling unit 132 may perform 3D modeling according to the type of the electronic device 200 based on the 3D spatial coordinate of the electronic device 200 calculated by the spatial coordinate calculation unit 120. The electronic device setting unit 134 may compare the 3D-modeled electronic device of the 3D modeling unit 132 with the electronic device information pre-stored in the electronic device information DB 150 to detect the corresponding electronic device, and may set a control signal according to the operation of the detected electronic device. Also, the touch location matching unit 136 may match direction information corresponding to the straight line between the user and the electronic device to generate a virtual two-dimensional contact point region for the virtual touch between the user and the electronic device based on the direction information that is matched. In this case, the virtual 2D contact point region may be generated closer to the electronic device than the user based on the 3D coordinate.

The user detecting unit 140 may include a touch location calculation unit 142 and a virtual touch processing unit 144. The user detecting unit 140 may calculate the virtual touch location and the change of the location for operating the electronic device 200 using the 3D coordinate data of the user's body calculated by the spatial coordinate calculation unit 120, and may generate a command code for performing a predetermined operation of the electronic device 200 based on the change of the calculated virtual touch location.

In this case, the touch location calculation unit 142 may calculate a first spatial coordinate and a second spatial coordinate based on the 3D spatial coordinate of the user's body calculated by the spatial coordinate calculation unit 120, and may calculate contact point coordinate data where a straight line connecting the first spatial coordinate and the second spatial coordinate meets a virtual contact point region generated in the touch location matching unit 136, using the first spatial coordinate (finger) and the second spatial coordinate (eye) that are calculated.

Generally, fingers of human body are the only part that can perform an elaborate and delicate manipulation. Particularly, thumb and/or index finger can perform a delicate pointing operation. Accordingly, it may be very effective to use tips of thumb and/or index finger as the first spatial coordinate. In a similar context, a pointer (e.g., tip of pen) having a sharp tip and gripped by a hand may be used instead of the tip of finger serving as the first spatial coordinate.

Also, in this embodiment, the central point of only one eye of a user may be used as the second spatial coordinate. For example, when a user views his/her index finger at the front of his/her eyes, the index finger may appear two. This occurs because the shapes of the index finger viewed by both eyes are different from each other (i.e., due to an angle difference between both eyes). However, when the index finger is viewed by only one eye, the index finger may be clearly seen. Also, although a user does not close one of eyes, when he/she views the index finger using only one eye consciously, the index finger can be clearly seen. Aiming at a target with only one eye in archery and shooting that require a high degree of accuracy complies with the above-mentioned principle.

In this embodiment, the principle that the shape of the tip of finger can be clearly recognized when the tip of the finger (first spatial coordinate) is viewed by only one eye (second spatial coordinate) may be applied. Thus, when a user can exactly view the first spatial coordinate, the virtual contact point region generated in the touch location matching unit 136 corresponding to the first spatial coordinate can be pointed.

In this embodiment, when one user uses one of his/her fingers, the first spatial coordinate may be the three-dimensional coordinate of the tip of one of the fingers or the tip of a pointer gripped by the fingers of the user, and the second spatial coordinate may be the three-dimensional coordinate of the central point of one of user's eyes. Also, when one user uses two or more fingers, the first spatial coordinate may include the three-dimensional coordinates of the tips of two or more fingers, and the second spatial coordinate may include the three-dimensional coordinates of the central points of one of eyes of two or more users. When there are two or more users, the first spatial coordinate may include the three-dimensional coordinates of the tips of one or more fingers provided by two or more users, respectively, and the second spatial coordinate may include the three-dimensional coordinates of the central points of one of eyes of two or more users.

The virtual touch processing unit 144 may determine whether or not there is a change of the contact point coordinate data for a predetermined time or more after the initial contact point coordinate data is calculated. When there is a change of the contact point coordinate data for the predetermined time or more, the virtual touch processing unit 144 may generate and output a command code for performing an operation set so as to correspond to the contact point coordinate data. Also, the virtual touch processing unit 144 may similarly operate regarding two fingers of one user or regarding two or more users.

Also, the virtual touch processing unit 144 may determine whether or not there is a change of the contact point coordinate data for a predetermined time or more after the initial contact point coordinate data is calculated. When there is no change of the contact point coordinate data for the predetermined time or more, the virtual touch processing unit 144 may determine whether or not there is a change in distance equal to or larger than a predetermined distance between the first spatial coordinate and the second spatial coordinate. When there is a change in distance equal to or larger than a predetermined distance, the virtual touch processing unit 144 may generate a command code for performing an operation set so as to correspond to the contact point coordinate data. Also, the virtual touch processing unit 144 may similarly operate regarding two fingers of one user or regarding two or more users.

On the other hand, when it is determined that the change of the contact point coordinate data is within a predetermined region, it may be considered that there is no change in the contact point coordinate data. Since a slight movement or tremor of finger or body occurs when a user points the electronic device with the tip of finger or pointer, it may be very difficult for a user to maintain the contact point coordinate. Accordingly, when the values of the contact point coordinate data exist within a predetermined region, it may be considered that there is no change in the contact point coordinate data.

Examples of electronic device to be remotely controlled according to an embodiment may include lighting, speaker, air conditioner, fan, blind, window, curtain, door, heating apparatuses, gas, microwave oven, video, camera, and CCTV, which constitute a home networking.

The remote control apparatus 100 may be configured separately from the electronic device to be remotely controlled, being applicable to various types of mobile electronic devices because the calculation of changed 3D spatial coordinate of the electronic device is free even when the electronic device moves.

When the command code generated in the user detecting unit 140 is inputted, the electronic device driving control unit 160 may convert the command code into a control command signal for the operation of a corresponding electronic device and may transmit the operation command signal to the corresponding electronic device. The operation command signal that is transmitted may be transmitted as an infrared ray (IR) signal of a typical remote controller, but the present invention is not limited thereto. For example, the operation command signal may also be transmitted by a short range wireless communication method such as WiFi and Bluetooth that are currently being used.

The electronic device information database (DB) 150 may store electronic device information about the manufacturers and model names of the electronic devices provided at home, protocol information applied to the operations for each electronic product, and the operation method for each electronic device. In this case, the operation method information refers to information such as the motion and touch location of the user's finger for controlling the power, illumination, volume, and temperature through the virtual touch. For reference, the information stored in the electronic device information DB 150 may be frequently updated by a user after the purchase of the electronic device. The updating of the information may be performed by accessing the websites of the electronic products to download the information of the corresponding electronic device or downloading the information of the corresponding electronic device through a transceiver provided in the electronic device. This can be implemented into various embodiments within the scope of the technical spirit of the present invention.

Embodiment 2

Figure 3:
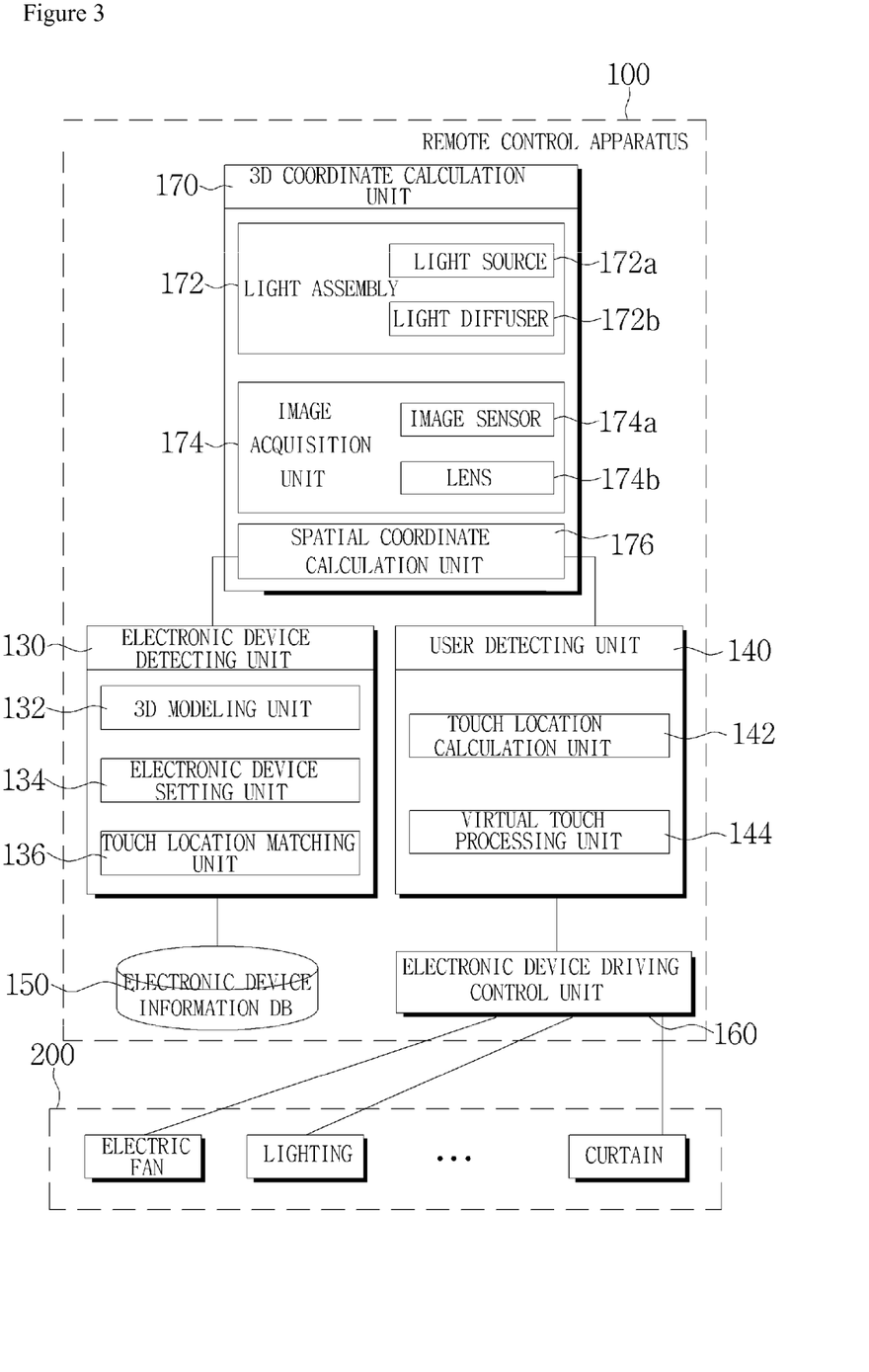
FIG. 3 is a view illustrating a remote control apparatus using a virtual touch of a 3D-modeled electronic device according to a second embodiment of the present invention.

FIG. 3 is a view illustrating a remote control apparatus using a virtual touch of a 3D-modeled electronic device according to a second embodiment of the present invention.

As shown in FIG. 3, a remote control apparatus 100 may include a 3D coordinate calculation unit 170, an electronic device detecting unit 130, a user detecting unit 140, an electronic device driving control unit 160, and an electronic device information database (DB) 150.

The 3D coordinate calculator 170 may include a lighting assembly 172, an image acquisition unit 174, and a spatial coordinate calculation unit 176. The 3D coordinate calculator 170 may project a coded pattern image on a user and an electronic device, and may calculate the 3D coordinate data of the user's body and the electronic device using an image of a scene on which structural light is projected.

In this case, the lighting assembly 172 may include a light source 172a and a light diffuser 172b, and may project a speckle pattern on the user's body and the electronic device. The image acquisition unit 174 may include an image sensor 174a and a lens 174b to capture the speckle patterns on the user's body and the electronic device projected by the lighting assembly 172. The image sensor 174a may usually include a Charge Coupled Device (CCD) or Complementary Metal-Oxide Semiconductor (CMOS) image sensor. Also, the spatial coordinate calculation unit 176 may serve to calculate 3D coordinate data of the user's body and the electronic device by processing the images acquired by the image acquisition unit 174.

The electronic device detecting unit 130 may include a 3D modeling unit 132, an electronic device setting unit 134, and a touch location matching unit 136. The electronic device detecting unit 130 may recognize spatial location information and product information of the electronic device 200 using the 3D coordinate data of the electronic device 200 calculated by the spatial coordinate calculation unit 176, and may generate a virtual contact point region for a virtual touch between the user and the electronic device based on the direction information corresponding to a straight line between the user and the electronic device. For reference, since the configuration of the electronic device detecting unit 130 is identical to that of the first embodiment and is described in detail above, a detailed description thereof will be omitted herein.

The user detecting unit 140 may include a touch location calculation unit 142 and a virtual touch processing unit 144. The user detecting unit 140 may calculate the virtual touch location and the change of the location for operating the electronic device 200 using the 3D coordinate data of the user's body calculated by the spatial coordinate calculation unit 176, and may generate a command code for performing a predetermined operation of the electronic device 200 based on the change of the calculated virtual touch location. For reference, since the configuration of the user detecting unit 140 is identical to that of the first embodiment and is described in detail above, a detailed description thereof will be omitted herein.

When the command code generated in the user detecting unit 140 is inputted, the electronic device driving control unit 160 may convert the command code into a control command signal for the operation of a corresponding electronic device and may transmit the operation command signal to the corresponding electronic device. The operation command signal that is transmitted may be transmitted as an infrared ray (IR) signal of a typical remote controller, but the present invention is not limited thereto. For example, the operation command signal may also be transmitted by a short range wireless communication method such as WiFi and Bluetooth that are currently being used.

The electronic device information database (DB) 150 may store electronic device information about the manufacturers and model names of the electronic devices provided at home and protocol information applied to the operations for each electronic product. In this case, the operation method information refers to information such as the motion and touch location of the user's finger for controlling the power, illumination, volume, and temperature through the virtual touch. For reference, the information stored in the electronic device information DB 150 may be frequently updated by a user after the purchase of the electronic device. The updating of the information may be performed by accessing the websites of the electronic products to download the information of the corresponding electronic device or downloading the information of the corresponding electronic device through a transceiver provided in the electronic device. This can be implemented into various embodiments within the scope of the technical spirit of the present invention.

Hereinafter, the operation of the remote control apparatus using the virtual touch of the 3D-modeled electronic device according to the embodiment of the present invention will be described in detail with reference to the drawings. The reference numerals identical to those of FIGS. 1 to 3 denote the same members that perform the same functions.

Figure 4:
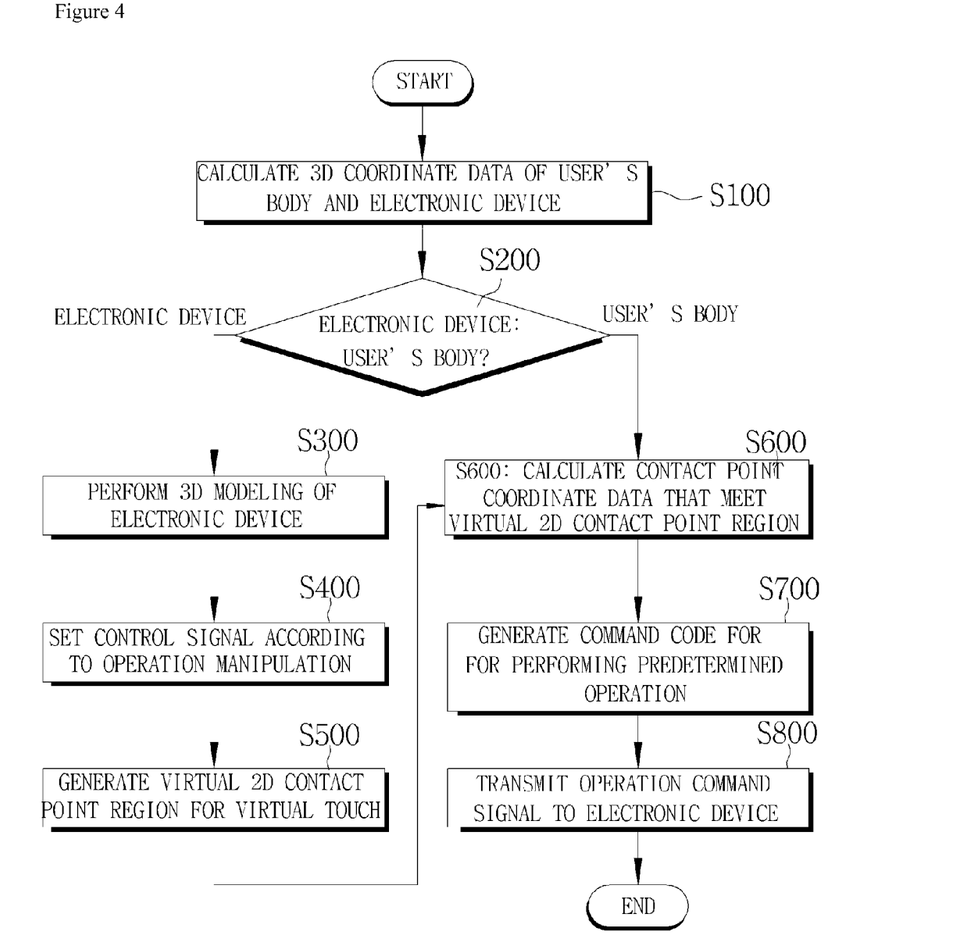
FIG. 4 is a flowchart illustrating a remote control method using a virtual touch of a three-dimensionally modeled electronic device according to an embodiment of the present invention.

FIG. 4 is a flowchart illustrating a remote control method using a virtual touch of a three-dimensionally modeled electronic device according to an embodiment of the present invention.

To describe the remote control method by referring to FIG. 4, first, 3D coordinate data of the user's body and the electronic device that are photographed by a camera may be calculated (S100).

3D modeling according to the type of the electric device may be performed by scanning the electric device using the 3D coordinate data according to the electric device (S300).

Based on the type of the 3D-modeled electric device, the electronic device setting unit 134 may compare the 3D-modeled electronic device with the electronic device information pre-stored in the electronic device information DB 150 to detect the corresponding electronic device, and may set a control signal according to the operation of the detected electronic device (S400).

Next, the touch location matching unit 136 may match direction information corresponding to the straight line between the user and the electronic device based on the extracted 3D coordinate data between the user's body and the electric device to generate a virtual two-dimensional contact point region for the virtual touch between the user and the electronic device based on the direction information that is matched (S500). In this case, the virtual 2D contact point region may be generated closer to the electronic device than the user based on the 3D coordinate.

The first spatial coordinate having the 3D coordinate of the tip of a user's finger and the second spatial coordinate having the 3D coordinate of the central point of a user's eye may be calculated using the 3D coordinate data of the user's body that are calculated, and the contact point coordinate data where the straight line connecting the first spatial coordinate and the second spatial coordinate meets the calculated virtual 2D contact point region may be calculated (S600).

Generally, fingers of human body are the only part that can perform an elaborate and delicate manipulation. Particularly, thumb and/or index finger can perform a delicate pointing operation. Accordingly, it may be very effective to use tips of thumb and/or index finger as the first spatial coordinate. In a similar context, a pointer (e.g., tip of pen) having a sharp tip and gripped by a hand may be used instead of the tip of finger serving as the first spatial coordinate.

Also, in this embodiment, the central point of only one eye of a user may be used as the second spatial coordinate. For example, when a user views his/her index finger at the front of his/her eyes, the index finger may appear two. This occurs because the shapes of the index finger viewed by both eyes are different from each other (i.e., due to an angle difference between both eyes). However, when the index finger is viewed by only one eye, the index finger may be clearly seen. Also, although a user does not close one of eyes, when he views the finger using only one eye consciously, the finger can be clearly seen. Aiming at a target with only one eye in archery and shooting that require a high degree of accuracy complies with the above-mentioned principle.

In this embodiment, the principle that the shape of the tip of finger can be clearly recognized when the tip of the finger (first spatial coordinate) is viewed by only one eye (second spatial coordinate) may be applied. Thus, when a user can exactly view the first spatial coordinate, the virtual contact point region generated in the touch location matching unit 136 corresponding to the first spatial coordinate can be pointed. Also, when one user uses two or more fingers, the first spatial coordinate may include the three-dimensional coordinates of the tips of two or more fingers, and the second spatial coordinate may include the three-dimensional coordinates of the central points of one of eyes of two or more users. When there are two or more users, the first spatial coordinate may include the three-dimensional coordinates of the tips of one or more fingers provided by two or more users, respectively, and the second spatial coordinate may include the three-dimensional coordinates of the central points of one of eyes of two of more users.

Next, the virtual touch processing unit 144 may determine whether or not there is a change of the contact point coordinate data with the generated virtual 2D contact point region. When there is a change of the contact point coordinate data, the virtual touch processing unit 144 may generate and output a command code for controlling a predetermined electronic device so as to correspond to the change of the contact point coordinate data (S700).

In this case, the determination of the change of the contact point coordinate data may be performed by determining whether or not there is a change of the contact point coordinate data for a predetermined time or more after the initial contact point coordinate data is calculated. Also, the virtual touch processing unit 144 may determine whether or not there is a change of the contact point coordinate data for a predetermined time or more after the initial contact point coordinate data is calculated. When there is no change of the contact point coordinate data for the predetermined time or more, the virtual touch processing unit 144 may determine whether or not there is a change in distance equal to or larger than a predetermined distance between the first spatial coordinate and the second spatial coordinate. When there is a change in distance equal to or larger than a predetermined distance, the virtual touch processing unit 144 may determine that there is a change in the contact point coordinate data. When there is a change in the contact point coordinate data, a command code may be generated to perform a predetermined operation that corresponds to the changed contact point coordinate data.

The command code that is generated may be converted into a control command signal for the operation of a corresponding electronic device, and an operation command signal may be transmitted to the corresponding electronic device (S800). The operation command signal that is transmitted may be transmitted as an infrared ray (IR) signal of a typical remote controller, but the present invention is not limited thereto. For example, the operation command signal may also be transmitted by a short range wireless communication method such as WiFi and Bluetooth that are currently being used.

Figure 5:
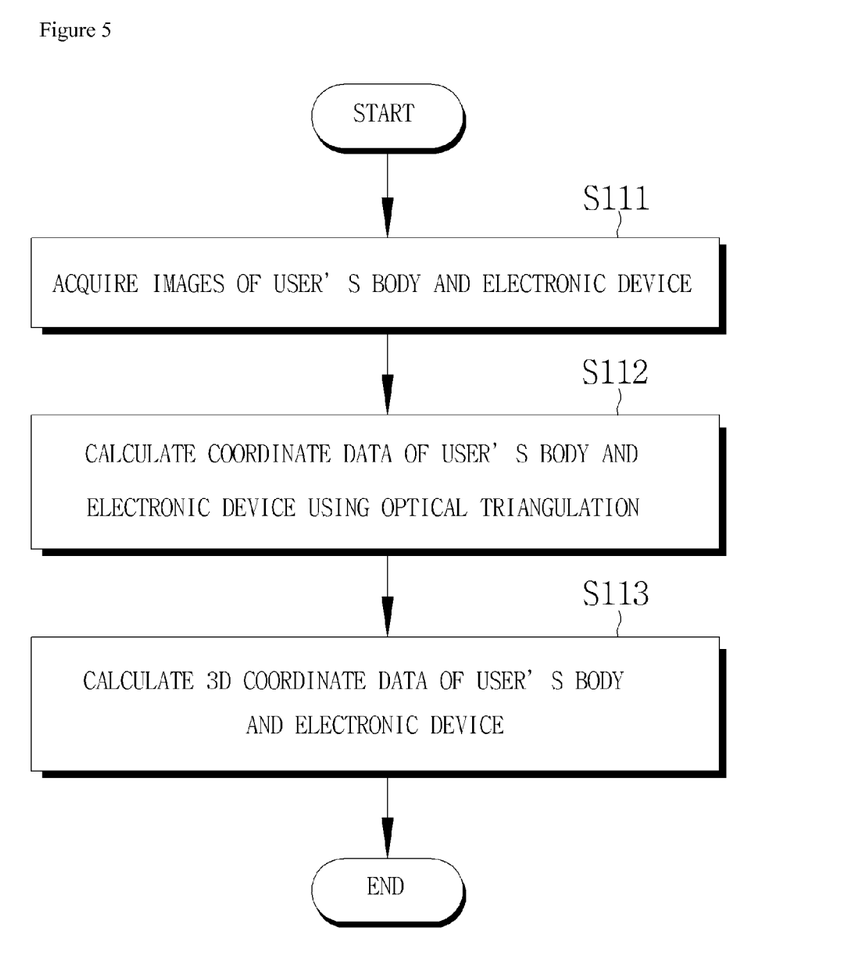
FIG. 5 is a flowchart illustrating a process of calculating 3D coordinate data of an electronic device and a user's body according to a first embodiment of the present invention.

FIG. 5 is a flowchart illustrating a process of calculating 3D coordinate data of an electronic device and a user's body according to a first embodiment of the present invention.

Referring to FIG. 5, the images of the user's body and the electronic device that are photographed from different angles through the two image sensors 112 and 114 of the image acquisition unit 110 of the camera module may be acquired (S111).

Next, the spatial coordinate calculation unit 120 may calculate coordinate data of the user's body and the electronic device from the images of the user's body and the electronic device photographed from the different angles using optical triangulation (S112).

The spatial coordinate calculation unit 120 may combine the calculated coordinate data to calculate the 3D coordinate data according to the 3D image information of the user's body and the electronic device (S113).

Examples of related techniques that extract the 3D coordinates using the triangulation may include a camera self calibration method, a Harris corner extracting method, SIFT method, and RANSAC method, and Tsai method. Particularly, a stereoscopic camera technique may also be used as a method of calculating the 3D coordinate data. The stereoscopic camera technique is a method of acquiring a distance from an expected angle with respect to a point by observing the same point of the surface of an object from two different points, similarly to a structure of binocular stereoscopic view that obtains a variation of an object from two eyes of human.

Figure 6:
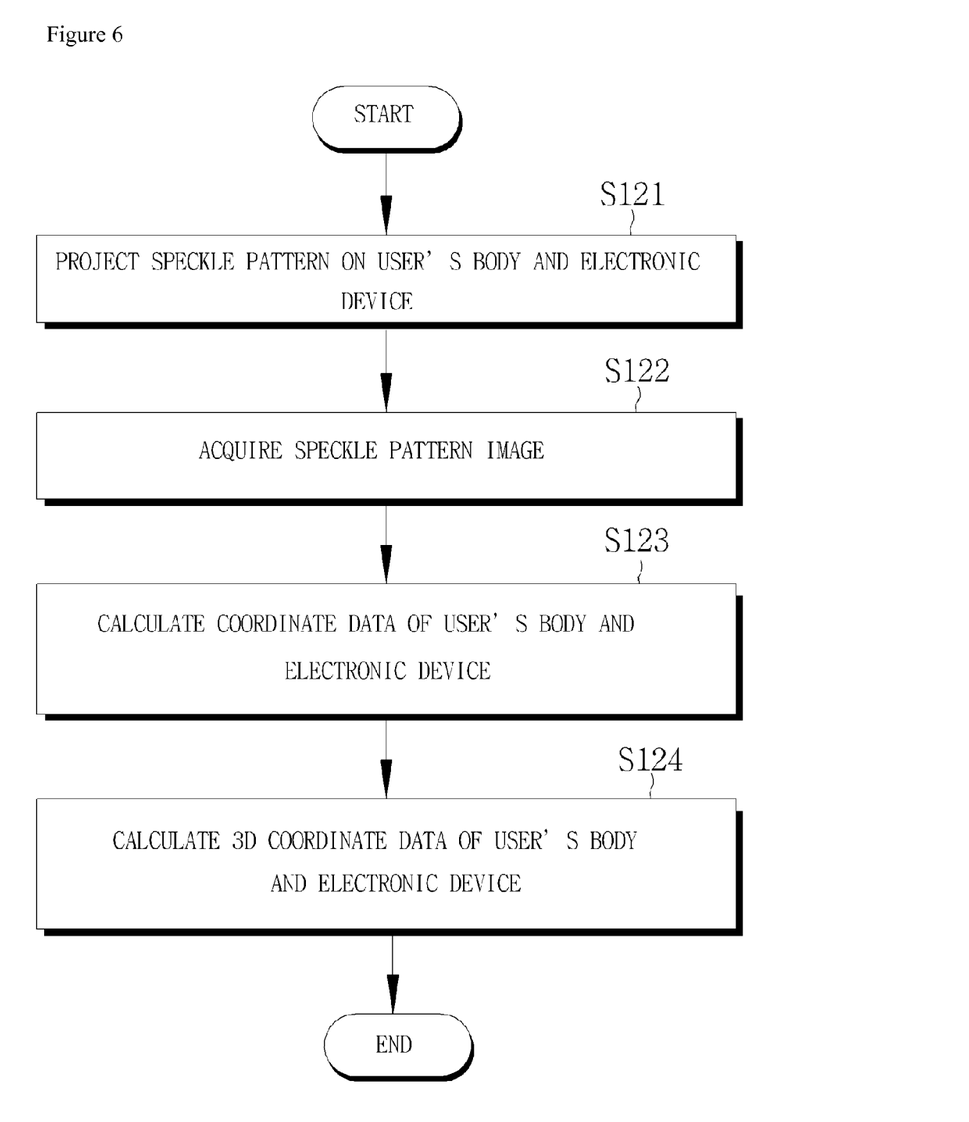
FIG. 6 is a flowchart illustrating a process of calculating 3D coordinate data of an electronic device and a user's body according to a second embodiment of the present invention.

FIG. 6 is a flowchart illustrating a process of calculating 3D coordinate data of an electronic device and a user's body according to a second embodiment of the present invention.

Referring to FIG. 6, the lighting assembly 172 may project a speckle pattern on the user's body and the electronic device (S121).

Then, the image acquisition unit 174 may capture the speckle pattern on the user's body and the electronic device projected by the lighting assembly 172 (S122).

Next, the spatial coordinate calculation unit 176 may calculate coordinate data of the user's body and the electronic data using depth values measured from the images of the speckle pattern (S123).

The spatial coordinate calculation unit 176 may combine the calculated coordinate data to calculate the 3D coordinate data according to the 3D image information of the user's body and the electronic device (S124).

By the way, the method of extracting the 3D coordinate using the time of flight may be an applicable technique that obtains three-dimensional information using a distance converted by dividing the time of flight taken for an ultrasonic wave from a transmitter to be reflected by an object and reach a receiver by a traveling speed of the ultrasonic wave. In addition, since there are various three-dimensional coordinate calculation methods using the time of flight, which can be easily carried out by those skilled in the art, a detailed description thereof will be omitted herein.

Figure 7:
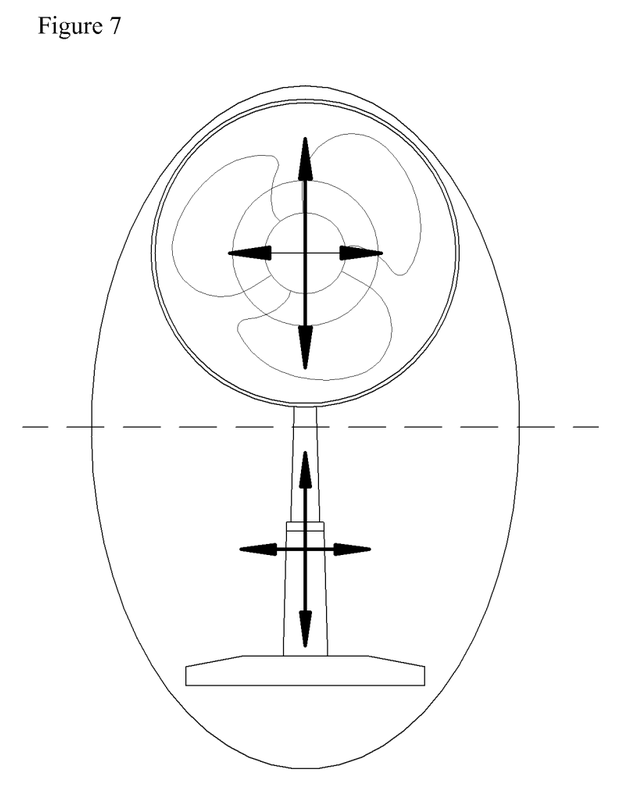
FIG. 7 is a view illustrating a specific example of a remote control method using a virtual touch of a three-dimensionally modeled electronic device according to an embodiment of the present invention.

FIG. 7 is a view illustrating a specific example of a remote control method using a virtual touch of a three-dimensionally modeled electronic device according to an embodiment of the present invention. Hereinafter, an electric fan may be described as an example of the electronic device.

As shown in FIG. 7, the touch location matching unit 136 may generate a 2D contact point region between the electric fan and the user, and then may set a touch region for a virtual touch according to the operation information stored in the electronic information DB 150. In FIG. 7, vertical touch regions may be set for the operation of the electric fan.

The touch location calculation unit 142 may calculate contact point coordinate data where a straight line connecting the first spatial coordinate and the second spatial coordinate meets a virtual 2D contact point region generated using the first spatial coordinate (finger) and the second spatial coordinate (eye), and then may determine whether or not the contact point coordinate data is changed according to the change of the first spatial coordinate.

Accordingly, when a user performs the left to right touch on an upper region of the 2D contact point region, it is recognized that the user requests the turning operation on the electric fan. On the other hand, when a user performs an up and down touch, it is recognized that the user requests the stopping of the turning of the electric fan. Also, when a user performs a virtual touch to the left or right side of the lower region of the 2D contact point region, it is recognized that the user controls the air volume of the electric fan. When a user performs a touch to the left side, the air volume of the electric fan may be reduced, and when the user performs a touch to the right side, the air volume of the electric fan may increase.

Also, when a user performs an up and down virtual touch, it is recognized that the user controls the power on/off of the electric fan.

In this case, since the 2D contact point region is located between a user and an electric device regardless of the directions of the front side, lateral side, and rear side of the electric device, a user can control the electric device from any direction through the virtual touch.

Similarly to the above-mentioned method, a user can control the power on/off, the illumination/volume/temperature, and the motion of blind, window, curtain, and door through the virtual touch of the 2D contact point region for each electric device.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The invention claimed is:

1. A remote control apparatus using a virtual touch of a three-dimensionally modeled electronic device, comprising:
    a 3D coordinate calculation unit extracting 3D coordinate data of a user's body and the electronic device using an image received through image photographing;
    an electronic device detecting unit recognizing spatial location information and product information of the electronic device using the 3D coordinate data of the electronic device extracted by the 3D coordinate calculation unit and generating a virtual contact point region for a virtual touch with a user and the electronic device based on direction information corresponding to a straight line between the user and the electronic device;
    a user detecting unit calculating a virtual touch location and a change of the location for operating the electronic device using the 3D coordinate data of the user's body calculated by the 3D coordinate calculation unit and generating a command code for operating a predetermined electronic device based on the change of the virtual touch location that is calculated;
    an electronic device driving control unit converting the command code generated by the user detecting unit into a control command signal for operating a corresponding electronic device to transmit an operation command signal to the corresponding electronic device when the command code generated by the user detecting unit is inputted; and
    an electronic device information database (DB) storing product information comprising a manufacturer and a model name of the electronic device, protocol information applied to the operation of each product, and operation method information of each electronic device.

2. The remote control apparatus of claim 1, wherein the 3D coordinate calculation unit comprises:
    an image acquisition unit comprising two or more image sensors disposed at different locations to photograph the user's body and the electronic device from different angles; and
    a spatial coordinate calculation unit for calculating the 3D coordinate data of the user's body and the electronic device using optical triangulation based on the images received from the image acquisition unit and photographed from the different angles.

3. The remote control apparatus of claim 1, wherein the 3D coordinate calculation unit comprises:
    a lighting assembly comprising a light source and a light diffuser to project a speckle pattern on the user's body and the electronic device;
    an image acquisition unit comprising an image sensor and a lens to capture the speckle pattern on the user's body and the electronic device projected by the lighting assembly; and
    a spatial coordinate calculation unit calculating the 3D coordinate data of the user's body and the electronic device using the speckle pattern captured by the image acquisition unit.

4. The remote control apparatus of claim 1, wherein the electronic device detecting unit comprises:
    a 3D modeling unit performing 3D modeling according to a type of the electronic device based on the 3D spatial coordinate of the electronic device calculated by the 3D coordinate calculation unit;
    an electronic device setting unit, based on the type of the 3D-modeled electric device, comparing the 3D-modeled electronic device with the electronic device information pre-stored in the electronic device information DB to detect the corresponding electronic device, and setting a control signal according to the operation of the detected electronic device; and
    a touch location matching unit for matching direction information corresponding to a straight line between the user and the electronic device to generate a virtual two-dimensional contact point region for the virtual touch between the user and the electronic device based on the direction information that is matched.

5. The remote control apparatus of claim 1, wherein the user detecting unit comprises:
    a touch location calculation unit for calculating a first spatial coordinate and a second spatial coordinate based on a 3D spatial coordinate of the user's body calculated by the 3D coordinate calculation unit to calculate contact point coordinate data where a straight line connecting the first spatial coordinate and the second spatial coordinate meets the virtual contact point region; and
    a virtual touch processing unit determining whether or not there is a change of the contact point coordinate data calculated by the touch location calculation unit and generating a command code for operating a predetermined electronic device when it is determined that there is a change of the contact point coordinate data.

6. The remote control apparatus of claim 5, wherein the first spatial coordinate is a three-dimensional coordinate of a tip of one of user's fingers or a tip of a pointer gripped by the user's fingers, and the second spatial coordinate is a three-dimensional coordinate of a central point of one of user's eyes.

7. The remote control apparatus of claim 5, wherein the virtual touch processing unit determines whether or not there is a change of the contact point coordinate data for a predetermined time or more after the initial contact point coordinate data is calculated, and when there is a change of the contact point coordinate data for the predetermined time or more, it is determined that there is a change of the contact point coordinate data.

8. The remote control apparatus of claim 7, wherein:
    the virtual touch processing unit determines whether or not there is a change of the contact point coordinate data for a predetermined time or more after the initial contact point coordinate data is calculated, and when there is no change of the contact point coordinate data for the predetermined time or more, the virtual touch processing unit determines whether or not there is a change in distance equal to or larger than a predetermined distance between the first spatial coordinate and the second spatial coordinate; and when there is a change in distance equal to or larger than a predetermined distance, the virtual touch processing unit generates a command code for operating a predetermined electronic device.

9. The remote control apparatus of claim 1, wherein the electronic device driving control unit transmits the operation command signal by a short range wireless communication method comprising Infrared Ray (IR) signal, WiFi, and Bluetooth.

10. A remote control method using a virtual touch of a three-dimensionally modeled electronic device, comprising:
(A) extracting 3D coordinate data of a user's body and the electronic device using an image received through image photographing;
(B) scanning the electronic device using 3D coordinate data according to the electronic device among the extracted 3D coordinate data to perform 3D modeling according to a type of the electronic device;
(C) based on the type of the 3D-modeled electric device, comparing the 3D-modeled electronic device with the electronic device information pre-stored in an electronic device information database to detect the corresponding electronic device, and setting a control signal according to the operation of the detected electronic device;
(D) matching direction information corresponding to a straight line between the user and the electronic device to generate a virtual contact point region for the virtual touch between the user and the electronic device based on the direction information that is matched;
(E) calculating a first spatial coordinate having a 3D coordinate of a tip of a user's finger and a second spatial coordinate having a 3D coordinate of a central point of a user's eye using the 3D coordinate data of the user's body among the extracted 3D coordinate data and calculating contact point coordinate data where a straight line connecting the first spatial coordinate and the second spatial coordinate meets the virtual contact point region that is generated;
(F) determining whether or not there is a change of the contact point coordinate data that meets the virtual 2D contact point region that is generated, and when there is a change of the contact point coordinate data, generating and outputting a command code of a predetermined electronic device so as to correspond to the change of the contact point coordinate data; and
(G) converting the generated command code into a control command signal for operating a corresponding electronic device to transmit an operation command signal to the corresponding electronic device.

11. The remote control method of claim 10, wherein (A) the extracting of the 3D coordinate data comprises:
photographing the user's body and the electronic device from different angles through an image acquisition unit comprising two or more image sensors disposed at different locations; and
calculating the 3D coordinate data of the user's body and the electronic device using optical triangulation based on images photographed from the different angles.

12. The remote control method of claim 10, wherein (A) the extracting of the 3D coordinate data comprises:

projecting a speckle pattern on the user's body and the electronic device through a light assembly;
capturing the speckle pattern on the user's body and the electronic device projected by the light assembly; and
calculating the 3D coordinate data of the user's body and the electronic device using the speckle pattern that is captured.

13. The remote control method of claim 10, wherein (F) the determining of whether or not there is a change of the contact point coordinate data comprises determining whether or not there is a change of the contact point coordinate data for a predetermined time or more after the initial contact point coordinate data are calculated, and when there is a change of the contact point coordinate data for the predetermined time or more, determining that there is a change of the contact point coordinate data.

14. The remote control method of claim 13, wherein (F) the determining of whether or not there is a change of the contact point coordinate data comprises:
determining whether or not there is a change of the contact point coordinate data for a predetermined time or more after the initial contact point coordinate data is calculated, and when there is no change of the contact point coordinate data for the predetermined time or more, determining whether or not there is a change in distance equal to or larger than a predetermined distance between the first spatial coordinate and the second spatial coordinate; and
generating a command code for operating a predetermined electronic device when there is a change in distance equal to or larger than a predetermined distance.

15. The remote control method of claim 10, wherein (G) the converting of the generated command code into a control command signal comprises transmitting the operation command signal by a short range wireless communication method comprising Infrared Ray (IR) signal, WiFi, and Bluetooth.

16. The remote control method of claim 10, wherein (F) the determining of whether or not there is a change of the contact point coordinate data comprises:
setting a touch region for a virtual touch operation in the generated 2D contact point region according to the operation method information pre-stored in the electronic device information database;
calculating the contact point data where the straight line connecting the first spatial coordinate and the second spatial coordinate meets the virtual contact point region; and
performing, by a user, at least one virtual touch operation of upward, downward, left, right, forward, and backward directions in the preset touch region of the virtual contact point region to request an operation of the electric device, and when it is determined that there is a change of the calculated contact point coordinate data according to a change of the first spatial coordinate, generating a command code for operating a predetermined electric device so as to correspond to the change of the contact point coordinate data.

17. The remote control method of claim 10, wherein the contact point region is located between the electric device and the user regardless of the front, lateral, rear direction of the electric device to allow the user to operate the electric device through the virtual touch in any direction of the electronic device.

* * * * *